US010698959B1

(12) United States Patent
Gerth et al.

(10) Patent No.: US 10,698,959 B1
(45) Date of Patent: Jun. 30, 2020

(54) SOCIAL WARNING SYSTEM (71) Applicant: United Services Automobile Association (USAA), San Antonio, TX (US)

(72) Inventors: William Gerth, Boerne, TX (US); Leonard S. Funari, San Antonio, TX (US); Allison Squires Treharne, Austin, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 303 days.

(21) Appl. No.: 15/689,923

(22) Filed: Aug. 29, 2017

Related U.S. Application Data (60) Provisional application No. 62/382,483, filed on Sep. 1, 2016, provisional application No. 62/383,958, filed on Sep. 6, 2016.

(51) Int. Cl.
*G06F 7/00* (2006.01)
*G06F 16/951* (2019.01)
*G06Q 50/00* (2012.01)

(52) U.S. Cl.
CPC ........... *G06F 16/951* (2019.01); *G06Q 50/01* (2013.01)

(58) Field of Classification Search
CPC ............... G06F 16/951; G06F 16/9536; G06F 16/5866; G06F 16/686; G06F 16/7867; G06Q 50/01
USPC .................................. 707/706, 754, 730, 737
See application file for complete search history.

(56) References Cited

U.S. PATENT DOCUMENTS

| 7,383,251 | B2* | 6/2008 | Might ................... G06Q 10/10 |
| 8,676,795 | B1* | 3/2014 | Durgin .................. G06F 16/34 |
| | | | 707/730 |
| 9,148,353 | B1* | 9/2015 | Pasqua ................. H04L 43/065 |
| 9,288,123 | B1* | 3/2016 | Safford .................. G06Q 50/01 |
| 9,460,163 | B1* | 10/2016 | Toal .................. G06Q 30/0201 |
| 9,519,936 | B2* | 12/2016 | Vijayaraghavan ..... G06Q 50/01 |
| 9,746,985 | B1* | 8/2017 | Humayun .............. G06Q 10/10 |
| 10,354,009 | B2* | 7/2019 | Liang ...................... G06F 16/35 |
| 2009/0006341 | A1* | 1/2009 | Chapman .............. G06F 16/951 |
| 2012/0102037 | A1* | 4/2012 | Ozonat ................. G06F 16/334 |
| | | | 707/738 |
| 2012/0239668 | A1* | 9/2012 | Bhattacharyya .... G06F 17/2785 |
| | | | 707/754 |
| 2014/0081998 | A1* | 3/2014 | Fan ......................... G06F 16/29 |
| | | | 707/754 |
| 2015/0032751 | A1* | 1/2015 | Ting ...................... G06F 16/285 |
| | | | 707/738 |
| 2015/0089399 | A1* | 3/2015 | Megill ................ H04L 12/1813 |
| | | | 715/753 |

(Continued)

*Primary Examiner* — Mohammed R Uddin
(74) *Attorney, Agent, or Firm* — Fish & Richardson P.C.

(57) ABSTRACT

Methods, systems, and apparatus, including computer programs encoded on computer storage media, to detect system problems using social media. One of the method includes monitoring posts on a plurality of social network sites. The method includes identifying posts that include at least one of a plurality of keywords, at least some of the keywords indicative of system problems. The method includes tagging the identified posts. The method includes determining, based on the tagged posts, that a system problem is occurring. The method also includes raising an alert regarding the system problem.

15 Claims, 6 Drawing Sheets

(56) References Cited

U.S. PATENT DOCUMENTS

| | | | |
|---|---|---|---|
| 2015/0169587 A1* | 6/2015 | Silverman | G06F 16/24578 |
| | | | 707/751 |
| 2016/0196561 A1* | 7/2016 | Iyer | G06Q 30/016 |
| | | | 705/304 |
| 2016/0203500 A1* | 7/2016 | Williams | G06Q 30/0203 |
| | | | 705/7.32 |
| 2017/0004205 A1* | 1/2017 | Jain | G06F 17/2775 |
| 2017/0286396 A1* | 10/2017 | Sandor | G06F 17/279 |
| 2018/0121929 A1* | 5/2018 | Cheng | G06Q 30/016 |

* cited by examiner

SOCIAL WARNING SYSTEM

CLAIM OF PRIORITY

This application claims priority to U.S. Patent Application Ser. No. 62/382,483, filed on Sep. 1, 2016, the entire contents of which are hereby incorporated by reference and U.S. Patent Application Ser. No. 62/383,958, filed on Sep. 6, 2016, the entire contents of which are hereby incorporated by reference.

BACKGROUND

Social media refers to computer-mediated tools that allow people, companies and other organizations to create, share, or exchange information in virtual communities and networks. Individuals can broadcast thoughts, data, and feelings to a wide variety of different sources.

Computer systems can fail or experience errors for a number of different reasons, including, but not limited to hardware failures, software bugs, network issues, malicious attacks from outside sources, and human error.

SUMMARY

This specification describes technologies relating to detecting issues using social media.

In general, one innovative aspect of the subject matter described in this specification can be embodied in methods that include the act of monitoring posts on a plurality of social network sites. The methods include the act of identifying posts that include at least one of a plurality of keywords, at least some of the keywords indicative of system problems. The methods include the act of tagging the identified posts. The methods include the act of determining, based on the tagged posts, that a system problem is occurring. The methods also include the act of raising an alert regarding the system problem.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Determining that a system problem is occurring may include comparing a count of keywords included in the posts to a count. The keywords may be organized into a plurality of categories. The categories may be indicative of the frequency with which the word appears in social network posts. Raising an alert may include identifying at least one user who should receive a message based on the matching keywords, identifying the posts that include the matching keywords, and sending the message to the user. The system problem may include one of a system outage, a security breach, and slow performance.

Particular embodiments of the subject matter described in this specification can be implemented so as to realize one or more of the following advantages. Computer problem may be detected quicker and cost effectively. Social networking data may be monitored efficiently.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

With the advent of social media, customers have a new avenue through which they can describe their experience. Customers may compliment or complain about a company. In many cases, customer's take their issues to the public, through social media, before attempting to resolve any issue with the company.

Social media networks have made it very easy for a customer to post a comment on social media. Accordingly, social media may reflect the moment to moment experience of a customer. For example, if a customer is frustrated about a relatively long response time when contacting a company, they may post about it on a social network. These problems often occur in silos therefore limiting the holistic view of the problem across channels. Accordingly, frequently problems can be identified through social networks before they are identified using any other channel. Accurate and efficient analysis of social network traffic across multiple social networks can provide an early warning to problems with the company's computer infrastructure and services.

Not all system problems are as easy to detect as a system failure. System problems may affect only a small number of users. For example, a programming glitch may only manifest itself to a small subset of users who happen to trigger its conditions. Memory and network infrastructure failures may be undetected for an extended period of time, as the effects may be only manifest as inconsistent errors or a general slowdown for a segment of the user base.

A social early warning system can monitor social media systems and can identify posts that discuss problems or issues experienced by the user base.

Figure 1:
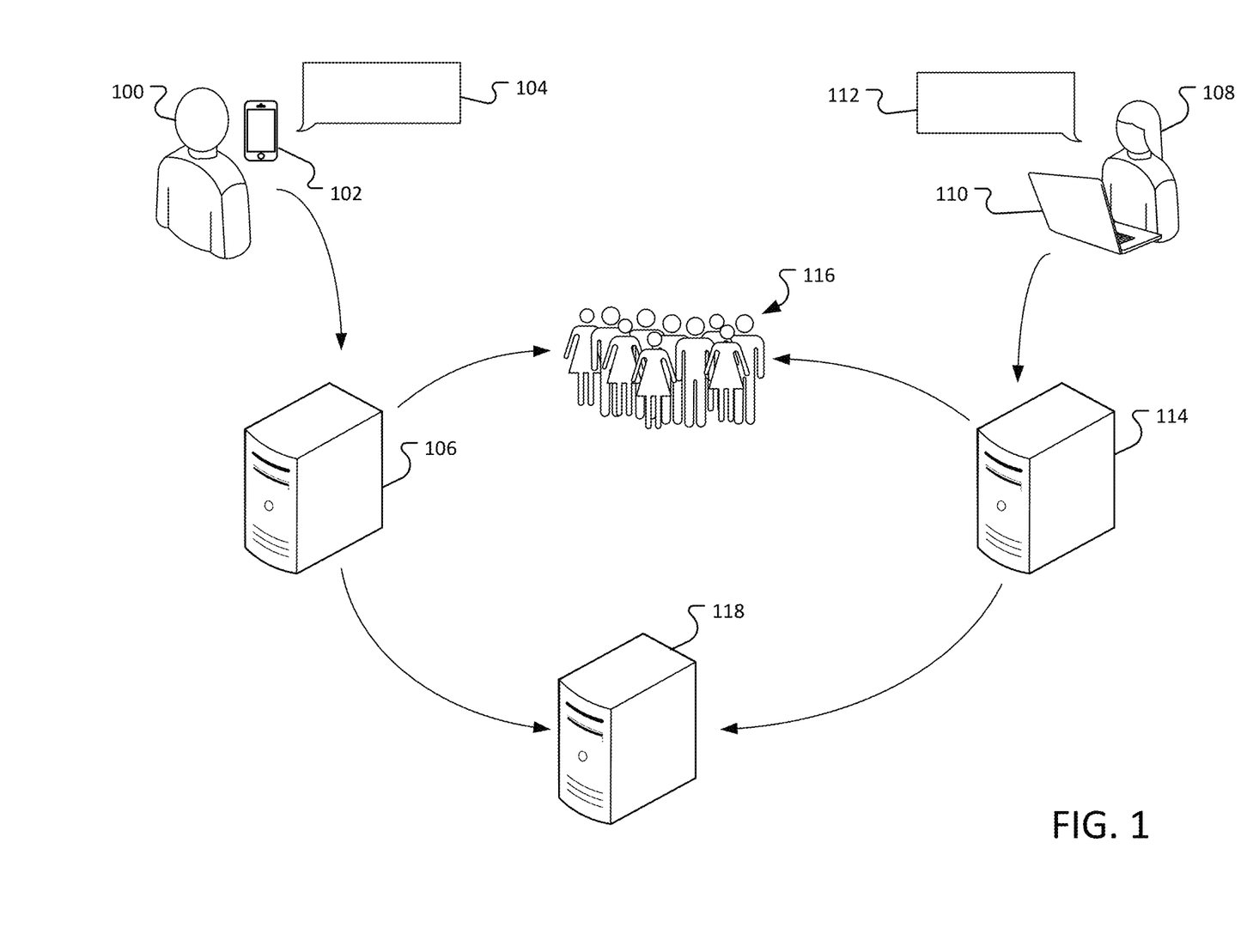
FIG. 1 illustrates an example of an environment for a social early warning system based on social network traffic.

FIG. 1 illustrates an example of an environment for a social early warning system based on social network traffic. A user 100 accesses a social network system 106 using a mobile device 102. The mobile device 102 may include a web browser or a dedicated app. The user 100 can provide a message 104 to the mobile device 102. The message 104 can be submitted to the social network system 106.

There can be multiple different social network systems (for example, FACEBOOK, TWITTER, LINKEDIN, etc. . . . ). A user 108 enters a message 112 into a notebook computer 110. The message can be sent to a different social network system 114. While this example describes accessing a social network system using a mobile device and a netbook computer, social networks may be accessed using a wide variety of different electronic devices.

The social network system 106 and the social network system 114 broadcast the message 104 and the message 112 to other users of the social network sites (collectively referred to by the crowd 116, although it should be understood that not all individuals access all social network sites).

A social early warning system 118 can monitor the activity on the social networking sites 106 and 114. The social early warning system 118 may monitor the same information feeds that are used to communicate with the crowd 116. Alternatively, the social early warning system 118 may integrate with a social networking system, for example, using an Application Programming Interface provided by the social network system.

The social early warning system may check the information from the social network systems for the presence of predefined keywords. Keywords can be either single words or phrases. These keywords may be indicative of a particular type of problem. For example, the social early warning system may be checking the information for posts that include the company name and words such as "down" or phrases such as "can't login," etc.

Figure 2:
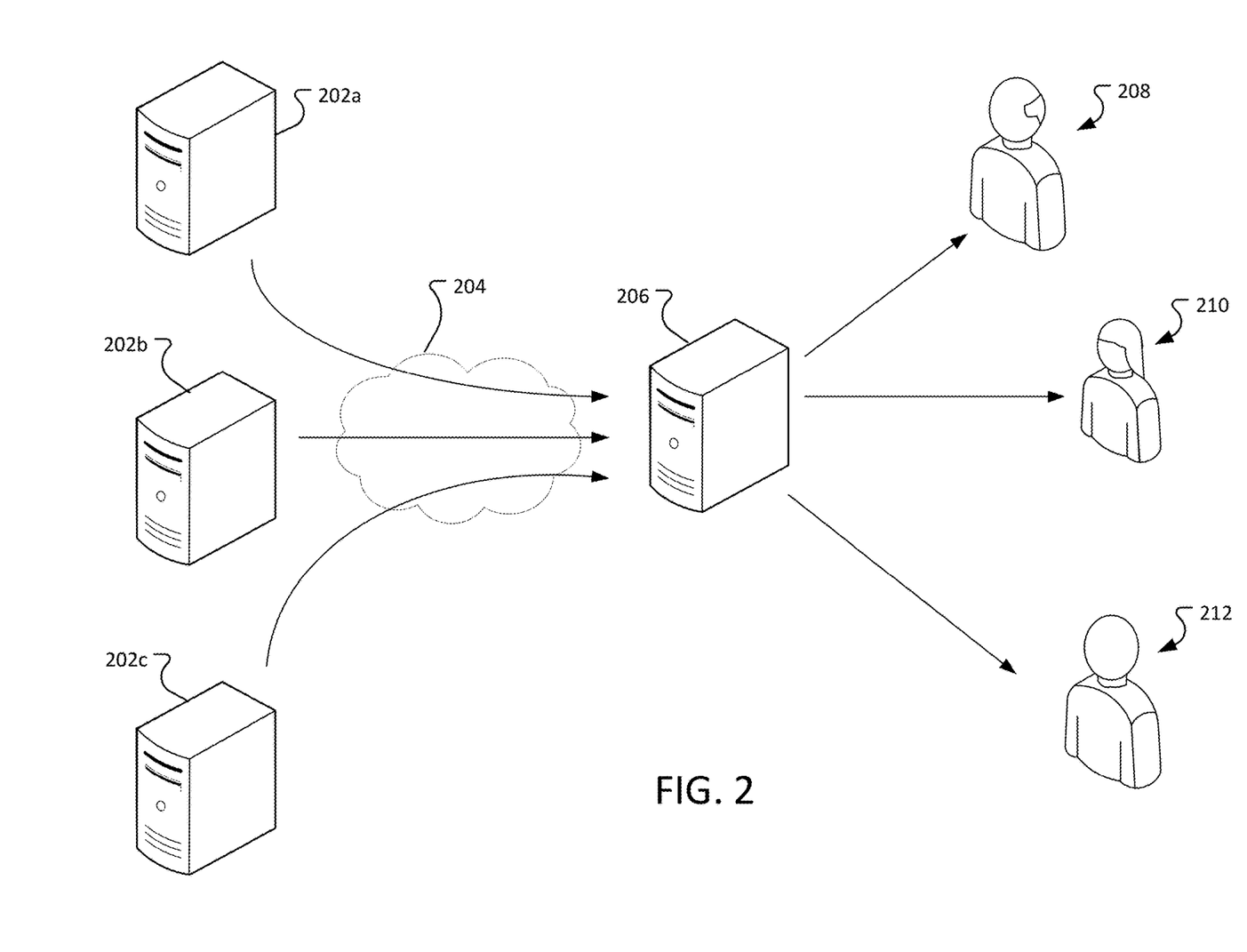
FIG. 2 illustrates an example of a social early warning system notifying individuals of issues.

FIG. 2 illustrates an example of a social early warning system notifying individuals of issues. The social early warning system 206 receives data from social networks 202*a-c*. The social early warning system 206 system examines the information from the social networks 202 *a-c* and identifies an alert to potential areas of interest for different parties. For example, the social early warning system 206 may be able to identify posts associated with different lines of business, different technical issues, and different computer systems within the company. For example, the social early warning system 206 may parse data provided by the social networks 202*a-c* to identify keywords of interest (for example, using search techniques, regular expressions, etc.).

The social early warning system 206 may determine that a particular keyword (or keywords) has occurred with sufficient frequency to warrant raising an alert. For example, the social early warning system 206 may compare the number of times a particular keyword or the number of times posts that include the keyword have occurred in a predefined time window to a predetermined threshold. If the number of times the keyword has occurred exceeds the threshold, the social early warning system 206 may determine to raise an alert.

When the social early warning system 206 raises an alert, the social early warning system 206 can contact predetermined individuals automatically. For example, an alert regarding the technical infrastructure may be routed to one individual 208, whereas an alert regarding computer bugs may be routed to a different individual 210. An alert regarding data errors may be routed to yet another individual 212.

The alerts may be in the form of e-mails, text messages, automated phone calls, or any combination thereof. In some implementations, computational resources may be preserved by limiting the number of alerts any particular individual can receive in a given time period. Alternatively, the system may be able to limit the number of alerts raised for a particular area of interest in a given period of time.

The type of alert may be customized based on user preferences, the time of day, the severity of the alert, and using other similar criteria.

Figure 3:
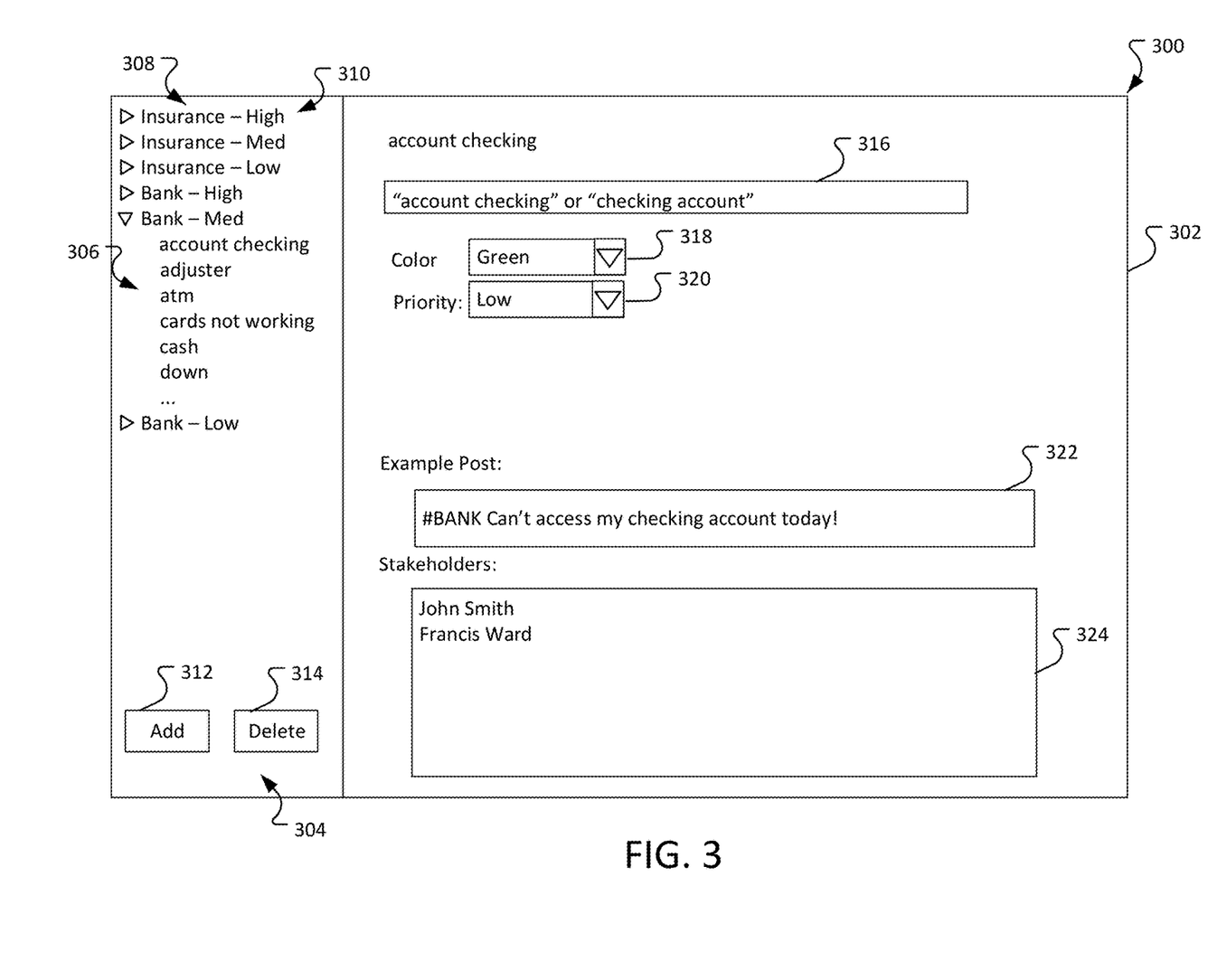
FIG. 3 illustrates an example of a user interface for specifying keywords.

FIG. 3 illustrates an example of a user interface 300 for specifying keywords. As described above, different keywords may be associated with different business and/or technical areas. Further, different keywords may tend to occur more or less frequently in social media. For example, the name of the company may be a very common keyword, whereas a keyword such as "can't login" may occur much less frequently. Similarly, different keywords may have more or less relative importance. For example, for a bank, the keyword "checking" may be relatively unimportant, while the keyword "crash" may be very important.

The social early warning system can enable a user to specify different groups for the keywords. Each group may be associated with a particular business and/or technical area. Each group may also be associated with a threshold number of times the keyword may occur within a window of time. The threshold number of times may reflect both how common the keyword is and how important the keyword is.

In some implementations, keywords may be divided into four categories for each business and/or technical area. Each category can define how often the keyword can appear without triggering an alert. For example, one category may allow keywords to appear 40 times in a 30-minute interval, another category may allow keywords to appear 25 times in the 30-minute interval. The remaining two categories may allow keywords to appear 15 times and 10 times respectively.

In some implementations, the window of time may be a rolling 30-minute window. Other durations may also be used, for example 15 minutes, 45 minutes, 60 minutes, etc.

In this example, the user interface 300 is divided into two sections. The left hand section 304 includes a drop down list of different groups. The right hand section 302 can include details about the group or keyword. For example, in some implementations, the right hand section 302 may include a query 316 that can define how the system determines matches for a particular keyword (in this example "account checking). The right hand section 302 can also include reporting details, such as a color 318 to use to highlight or emphasize the keyword and a priority 320 which indicates the relative importance of the keyword.

The right hand section 302 can also include an example post 322 showing sample content that matches the keyword.

The right hand section 302 can also include a list of stakeholders 324 to be notified if an alert on the keyword is triggered.

The left hand section 304 includes a hierarchy of groups and keywords. In this example, the groups include an insurance—high group 310, an insurance—med group, an insurance-low group, a bank—high group, a bank—med group, and a bank—low ground. In this example, the bank—med group has been expanded to show some of the keywords 306 associated with the bank—med group. For example, the bank—med group includes the keywords account checking, adjuster, ATM card not working, cash, and down, among others.

Although the hierarchy in the right section 304 of the user interface 300 is shown as a flat hierarchy (for example, groups represent the top level and each group includes keywords) other organizational structures may also be used. For example, there may be a group for low, medium, and high frequency keywords, underneath these groups may be subgroups that specify the different business/technical areas. Alternatively, the hierarchy may be organized based on business/technical areas at the top level, with different frequencies defined underneath.

In some implementations, groups may be cross referenced across business and technical areas. For example, in the business areas there may be a list of keywords associated with the bank and a list of keywords associated with insurance. In the technical area there may be a list of keywords associated with security and a list of keywords associated with service level agreement data (such as uptime). Groups may be created by combining keywords from a business area with keywords from a technical area.

The user interface 300 includes the ability to add keywords, by selecting the add button 312 or using a menu item. The user interface 300 also includes the ability to delete an item, by selecting the delete button 314 or using a menu item.

Figure 4:
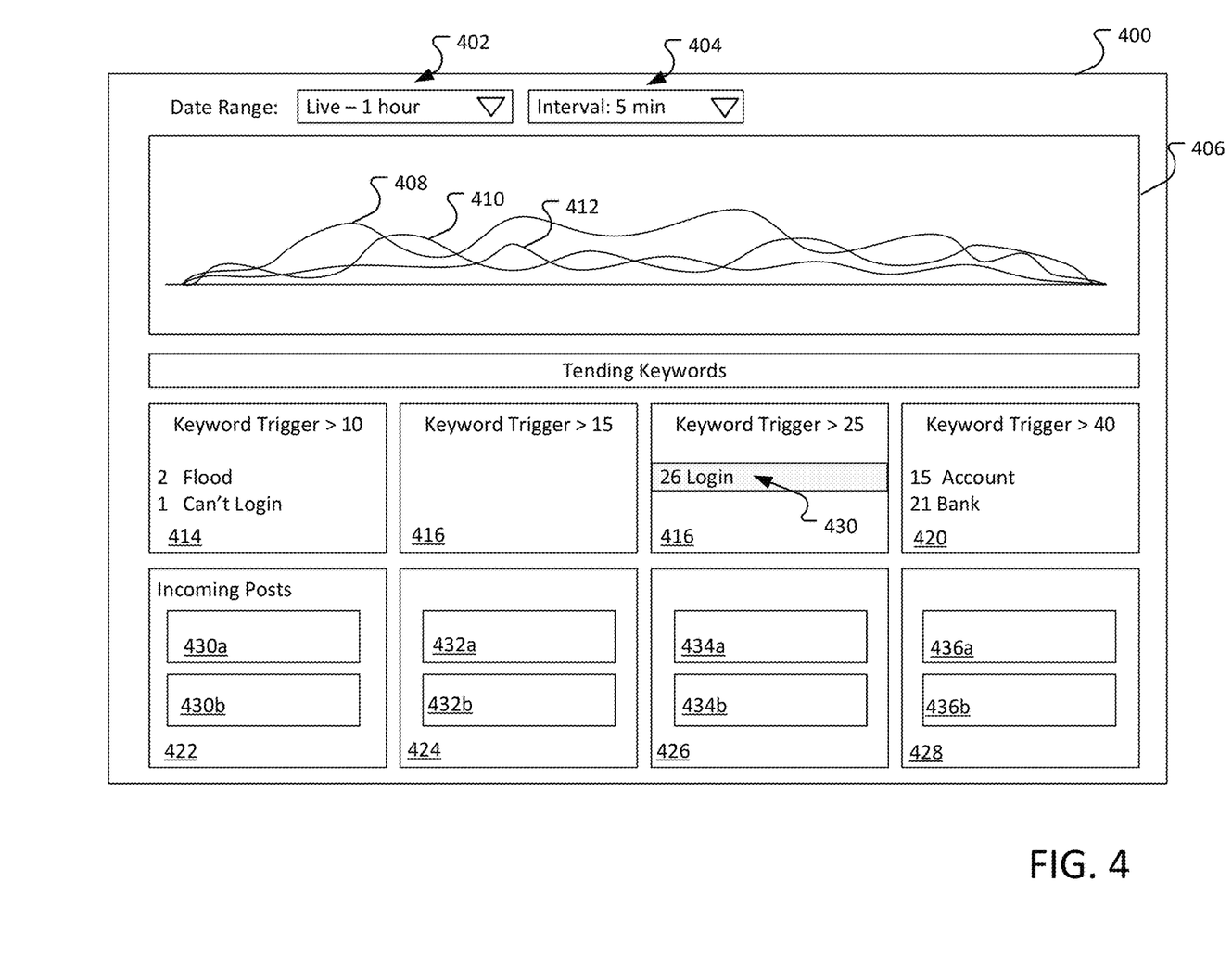
FIG. 4 is an example user interface of a dashboard that illustrates recent keyword activity.

FIG. 4 is an example user interface 400 of a dashboard that illustrates recent keyword activity. The user interface includes a control 402 that enables the user to view activity over a given period of time. For example, the control 402 is currently set to provide a live feed of keywords over the previous hour. The user interface 400 also includes an interval control 404 that enables the user to set a refresh rate. In this example, the refresh rate is set to refresh in five-minute intervals. Setting a refresh rate, as opposed to having continual updates, is used to strike a balance between the computational efficiency and network usage involved in tracking keyword information and obtaining that information in a timely fashion.

The user interface 400 also includes a graph 406 that displays the keywords appearing on different social media sites. In this example, each line represents activity on a different social media site. For example, the line 408 represents keyword activity on one site (such as FACEBOOK). The second line 410 represents keyword activity on a different site (such as TWITTER). And the third line 412 represents keyword activity on yet another site (such as LINKEDIN). In some implementations, an additional line may be present that aggregates the activity across multiple social network sites. Different customers may have different channel preferences. Therefore, aggregating keywords and posts across multiple channels can capture one customer talking about an outage on FACEBOOK while another customer mentions the same outage on TWITTER, and yet another customer mentioning it on COMMUNITY. Aggregating multiple social network sites enables issues to be identified faster and more efficiently.

The user interface 400 includes an area where trending keywords are displayed based on different categories. In general, trending keywords, are keywords that have occurred on the monitored social network sites. For example, keywords that occur in the low frequency category (keywords for which an alert is triggered if the keyword occurs more than 10 times in the window) can be presented in the "Keyword Trigger >10" area 414. In this example, the keyword "flood" has occurred twice, and the keyword "can't login" has occurred once. As these values are below the threshold value of greater than ten, no alert is raised.

The "Keyword Trigger >15" area 416 is empty. The "Keywork Trigger >25" area includes a Login keyword 430. The "Login" keyword has occurred 26 times. As this keyword has occurred more than the threshold number of times (here 25) an alert will be raised. For example, an e-mail or other message may be sent to a stakeholder user. In some implementations, keywords that have exceeded the threshold may be highlighted or otherwise emphasized. In this example, the "Login" keyword has been highlighted with a grey bar.

The "Keyword Trigger >40" are 420 includes the keywords "Account", which occurred 15 times, and "Bank" which occurred 21 times.

The user interface 400 can also display the social media posts that corresponds to the keywords in each category. For example, the "Keyword Trigger >10" incoming posts 422 include posts 430a-b. The "Keyword Trigger >15" incoming posts 424 include posts 432a-b. The "Keyword Trigger >25" incoming posts 426 include posts 434a-b. The "Keyword Trigger >40" incoming posts 428 include posts 436-b.

While this example uses four different categories with keyword thresholds of 10, 15, 25, and 40, other implementations may use a different number of categories and/or include different thresholds. In some implementations, the number of categories and their respective thresholds may be determined through a statistical analysis of previous social media activities. Similarly, the appropriate size of the window may vary between different implementations. For example, a less frequently used system or a system that experiences relatively low traffic may use a longer window or a lower threshold.

As the system is monitoring the social network sites on an ongoing basis the same keywords may trigger an alert multiple times. For example, if the keyword "crash" occurs in social media feeds more than the predetermined number of times, it is likely that during the next interval, the number of times the keyword "crash" occurs will remain above the threshold. In order to prevent multiple messages being sent to the stakeholder users, the system may engage a timeout period for a particular term (for example, the term "crash" will not trigger another message for a predetermined period of time (for example, a time window, an hour, a day, etc. . . . ).

In some implementations, combinations of keywords can be used to determine whether to raise a second alert. For example, if the keywords "bank" and "crash" occur sufficiently often to result in an alert which sends a message to a key stakeholder, then subsequent occurrences of "bank" and "crash" will not trigger an alert; however, occurrences of "insurance" and "crash" may trigger a separate alert.

In some implementations, an alert may be dismissed. Dismissing an alert may cause the keyword counters to reset to zero and/or cause no alerts based on the same criteria to be raised during a predetermined period of time. For example, timeouts may be limited to 30 minutes, 60 minutes, 1 day, etc. . . . . The criteria can be the triggering keywords (for example, no new alerts on the "crash" key word) and/or no alerts sent to the same stakeholder.

In some implementations, the system may limit the number of messages that a particular stakeholder may receive in a given period of time.

The system may be able to determine if a particular social media user is posting multiple messages and may react accordingly. For example, a single social media user may be prevented from causing an alert to raise single handled. The system may determine the identity of the social media user based, for example, on the social media accounts, Internet Protocol Addresses, cookies, sessions, or other identifiers.

In some implementations, the system be able to detect social media attacks (for example, using bots to flood social media networks). The system may discount or ignore keywords generated by this social media attack. In some implementations, the system may discount the keywords based on, for example, the age of the social media account. For example, a newly created social media account is more likely to be an account created for the purpose of orchestrating the attack, rather than to raise a legitimate issue.

Figure 5:
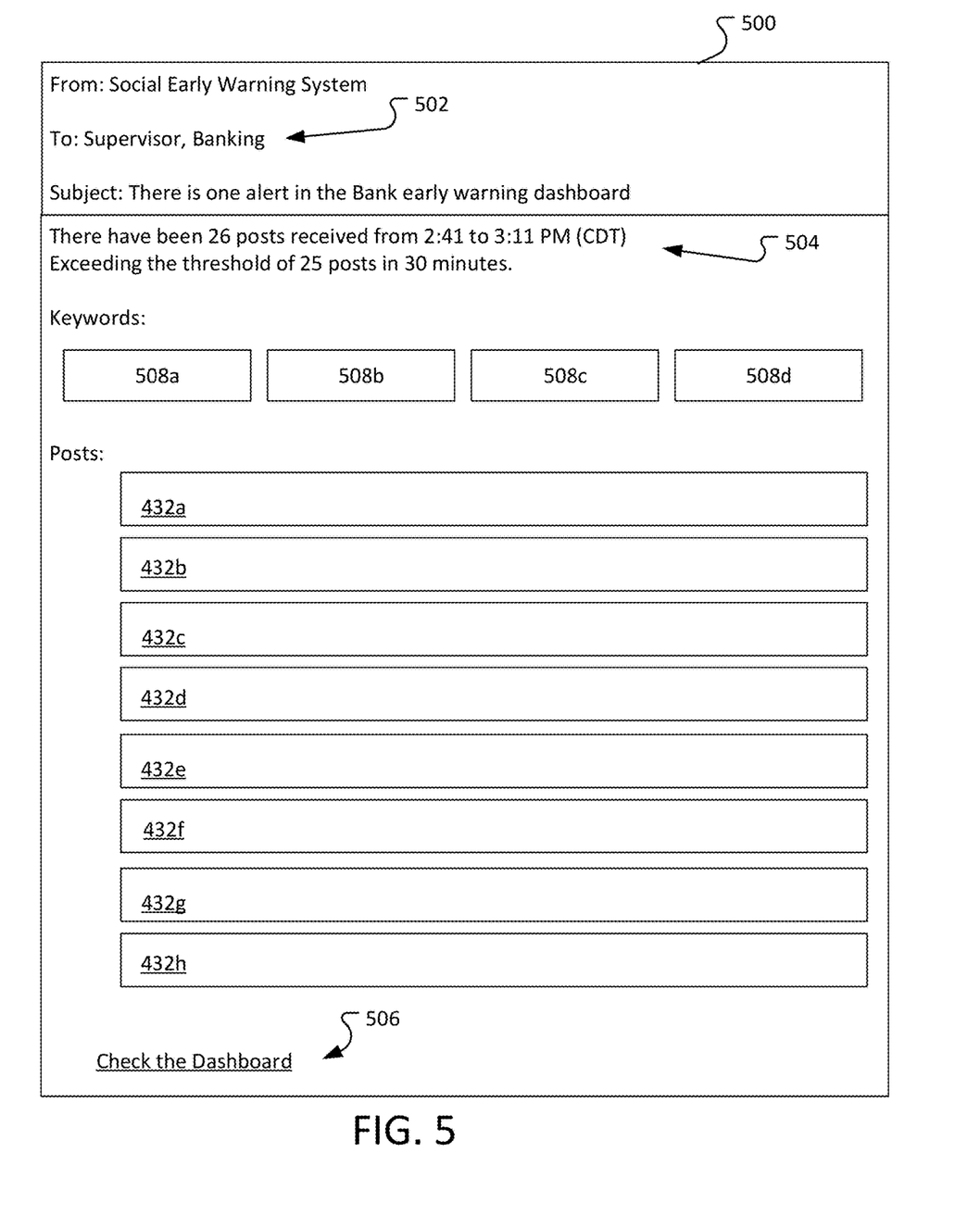
FIG. 5 illustrates an example of message that is sent in response to an alert.

FIG. 5 illustrates an example of message 500 that is sent in response to an alert. The message may be sent to a stakeholder user who has been identified to receive alerts corresponding to a particular category. In this example, the alert has been sent to the banking supervisor 502. The message may include details of the alert 504. In this example, the message indicates that the number of post that include a particular keyword within the window has exceeded the threshold.

The message 500 may include the keywords 508a-d) that caused the alert to trigger. In some implementations, the message can include the number of times that the particular keyword appeared within the window (here, a rolling 30 minutes).

The message 500 may include a copy of the posts 432a-h. For clarity and space only eight posts are shown, in practice this example would generally include the 26 posts which triggered the alert.

In some implementations, the message may include a link 506 on the message that would cause an electronic device (such as a smartphone, computer, etc.) to navigate to the dashboard.

Figure 6:
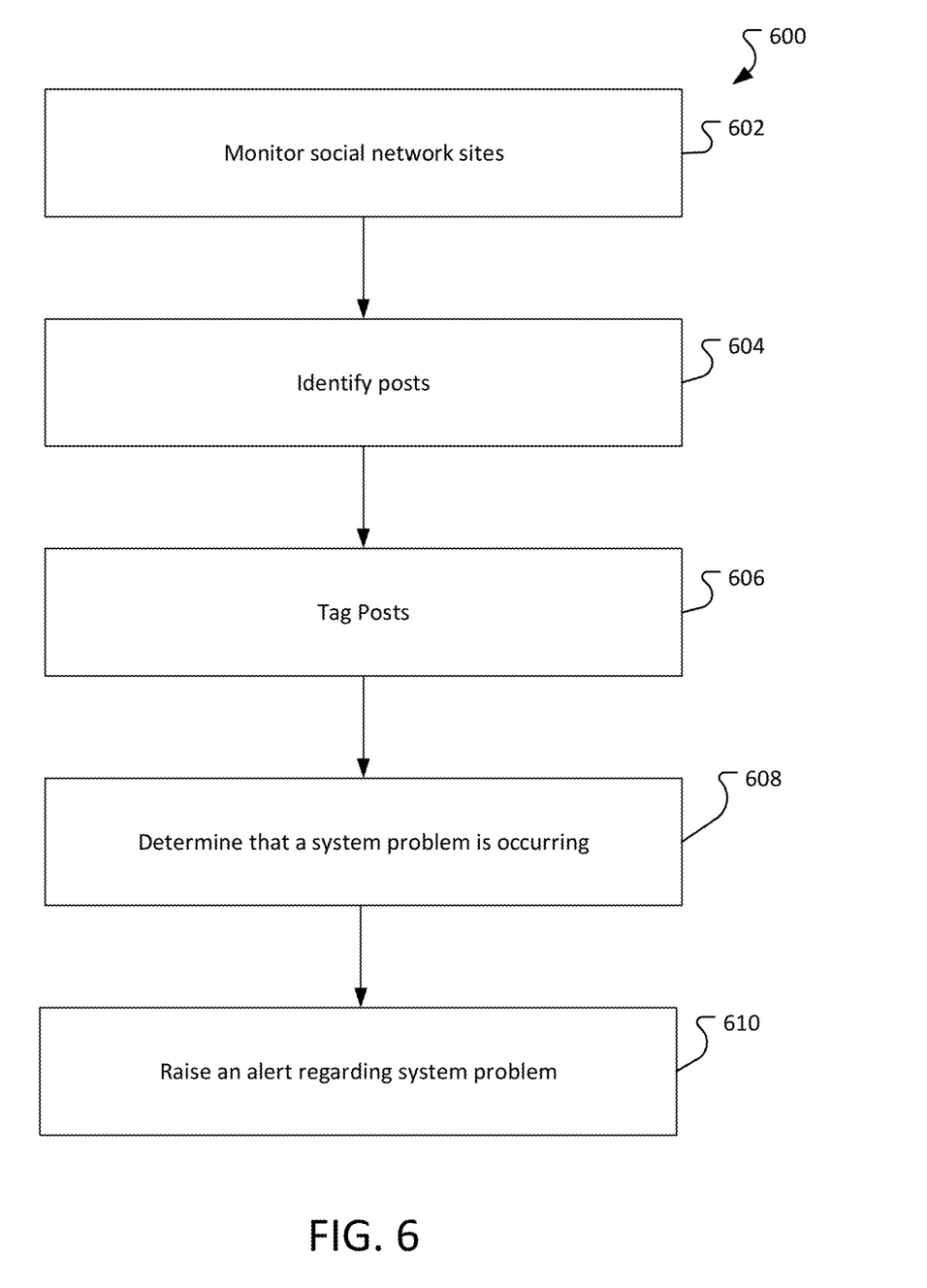
FIG. 6 is a flow chart of an example process for detecting system issues using social networking.

FIG. 6 is a flow chart of an example process 600 for detecting system issues using social networking. The process 600 can be performed by one or more computer systems working in cereal or in parallel.

The process 600 monitors 602 social networking sites. Monitoring a social networking site may include, for example, monitoring data provided by the social networking site. In some implementations monitoring a social networking site may include accessing the social networking site using application programming interfaces provided by the social networking site.

The process 600 identifies 604 posts. For example, the process 600 identifies 604 posts that include at least one of a plurality of keywords, at least some of the keywords indicative of system problems. In some implementations, a keyword may be indicative of a system problem, or may be indicative of any of a number of different system problems. In some implementations, a keyword may be indicative of a system problem when combined with other keywords.

The process 600 tags 606 the identified posts. The posts may be tagged within the social warning system or may be tagged within the social media network.

The process 600 determines 608 that a system problem is occurring. The process 600 may determine that a system problem is occurring by comparing the number of posts that include the keywords to a threshold value. The process 600 may also determine that a system problem is occurring by comparing the number of times that a keyword occurs in the social networking site data.

The process 600 raises 610 and alert regarding the system problem. The alert may be, for example, a text message, an email, an automated telephone call, or any other mechanism whereby the computer system may contact a stakeholder user.

In addition to system problems, the system described above can also be used to detect other kinds of problems, including problems with products and services offered by the company. For example, the system can be used to detect problems with call center hold times which may be indicative of either a problem with the call center call routing system or with the performance of (or number of) the customer service representatives available to handle calls. As such, the system can be used to detect issues related to a company's brand and reputation by monitoring negative comments referencing the company's brand and reputation.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs (i.e., one or more modules of computer program instructions, encoded on computer storage mediums for execution by, or to control the operation of, data processing apparatus). A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices). The computer storage medium can be non-transitory.

The operations described in this specification can be implemented as operations performed by a data processing apparatus on data stored on one or more computer-readable storage devices or received from other sources.

The keyword "data processing apparatus" encompasses all kinds of apparatus, devices, and machines for processing data, including by way of example, a programmable processor, a computer, a system on a chip, or multiple ones, or combinations, of the foregoing. The apparatus can include special purpose logic circuitry (e.g., an FPGA (field programmable gate array) or an ASIC (application-specific integrated circuit)). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural or object-oriented or functional languages, and it can be deployed in any form, including as a stand-alone program or as a module, component, subroutine, service, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital, analog or quantum computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive, data from or transfer data to, or both, one or more mass storage devices for storing data (e.g., electronic, magnetic, magneto-optical disks, or optical disks), however, a computer need not have such devices.

Moreover, a computer can be embedded in another device (e.g., a mobile telephone, a personal digital assistant (PDA), a mobile audio or video player, a game console, a GPS receiver, or a portable storage device (e.g., a universal serial bus (USB) flash drive)), to name just a few. Devices suitable for storing computer program instructions and data include all forms of non-volatile memory, media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user (for example, by sending web pages to a web browser on a user's user device in response to requests received from the web browser).

Embodiments of the subject matter described in this specification can be implemented in a computing system that includes a back-end component (e.g., as a data server), a middleware component (e.g., an application server), or a front-end component (e.g., a user computer having a graphical user interface or a Web browser through which a user can interact with an implementation of the subject matter described in this specification), or any combination of one or more such back-end, middleware, or front-end components. The components of the system can be interconnected by any form or medium of digital or optical data communication (e.g., a communication network). Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for detecting system problems, the method comprising:
    monitoring posts on a plurality of social network sites;
    identifying posts that include at least one of a plurality of keywords, at least some of the keywords indicative of system problems;
    tagging the identified posts;
    determining, based on the tagged posts, that a system problem is occurring, including determining whether one or more of the tagged posts are associated with a social media attack and comparing a count of keywords included in the one or more tagged posts that are determined to be unassociated with a social media attack to a threshold count, wherein determining whether one or more of the tagged posts are associated with a social media attack comprises determining an age of a social media account corresponding to the one or more tagged posts; and
    raising an alert regarding the system problem.

2. The method of claim 1, wherein the keywords are organized into a plurality of categories.

3. The method of claim 2, wherein the categories are indicative of the frequency with which the word appears in social network posts.

4. The method of claim 1, wherein raising an alert comprises:
 identifying at least one user who should receive a message based on the matching keywords;
 identifying the posts that include the matching keywords; and
 sending the message to the user.

5. The method of claim 4, wherein the system problem comprises one of a system outage, a security breach, and slow performance.

6. A non-transitory computer storage medium encoded with computer program instructions that when executed by one or more computers cause the one or more computers to perform operations comprising:
 monitoring posts on a plurality of social network sites;
 identifying posts that include at least one of a plurality of keywords, at least some of the keywords indicative of system problems;
 tagging the identified posts;
 determining, based on the tagged posts, that a system problem is occurring, including determining whether one or more of the tagged posts are associated with a social media attack and comparing a count of keywords included in the one or more tagged posts that are determined to be unassociated with a social media attack to a threshold count, wherein determining whether the one or more tagged posts are associated with a social media attack comprises determining an age of a social media account corresponding to the one or more tagged posts; and
 raising an alert regarding the system problem.

7. The non-transitory computer storage medium of claim 6, wherein the keywords are organized into a plurality of categories.

8. The non-transitory computer storage medium of claim 7, wherein the categories are indicative of the frequency with which the word appears in social network posts.

9. The non-transitory computer storage medium of claim 6, wherein raising an alert comprises:
 identifying at least one user who should receive a message based on the matching keywords;
 identifying the posts that include the matching keywords; and
 sending the message to the user.

10. The non-transitory computer storage medium of claim 9, wherein the system problem comprises one of a system outage, a security breach, and slow performance.

11. A system comprising:
 one or more computers and one or more storage devices storing instructions that are operable, when executed by the one or more computers, to cause the one or more computers to perform operations comprising:
 monitoring posts on a plurality of social network sites;
 identifying posts that include at least one of a plurality of keywords, at least some of the keywords indicative of system problems;
 tagging the identified posts;
 determining, based on the tagged posts, that a system problem is occurring, including determining whether one or more of the tagged posts are associated with a social media attack and comparing a count of keywords included in the one or more tagged posts that are determined to be unassociated with a social media attack to a threshold count, wherein determining whether one or more of the tagged posts are associated with a social media attack comprises determining an age of a social media account corresponding to the one or more tagged posts; and
 raising an alert regarding the system problem.

12. The system of claim 11, wherein the keywords are organized into a plurality of categories.

13. The system of claim 12, wherein the categories are indicative of the frequency with which the word appears in social network posts.

14. The system of claim 11, wherein raising an alert comprises:
 identifying at least one user who should receive a message based on the matching keywords;
 identifying the posts that include the matching keywords; and
 sending the message to the user.

15. The system of claim 14, wherein the system problem comprises one of a system outage, a security breach, and slow performance.

\* \* \* \* \*